R. P. BARNSTEAD.
STERILIZER FOR DRINKING GLASSES.
APPLICATION FILED JUNE 3, 1915.
1,202,147.
Patented Oct. 24, 1916.
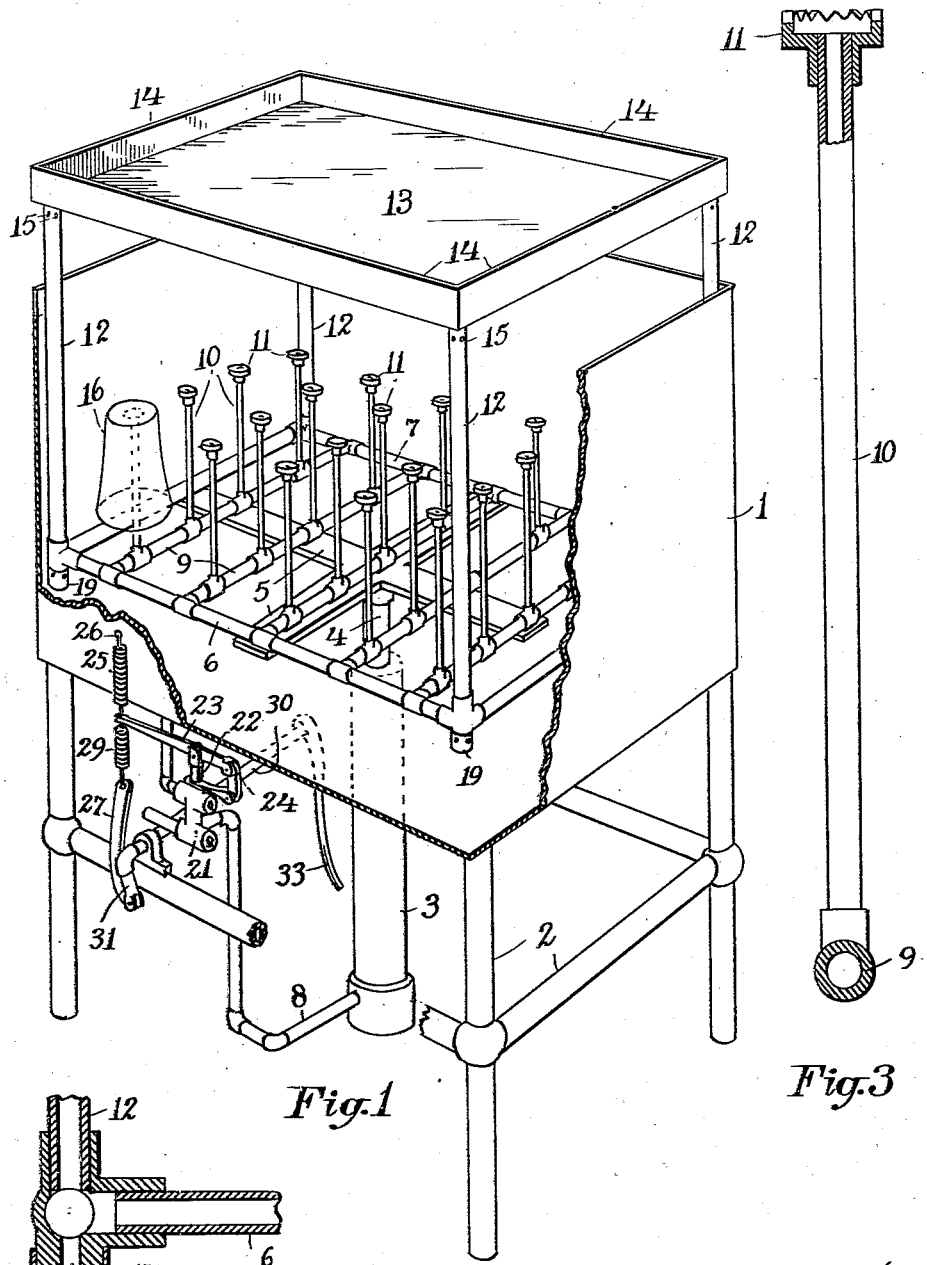
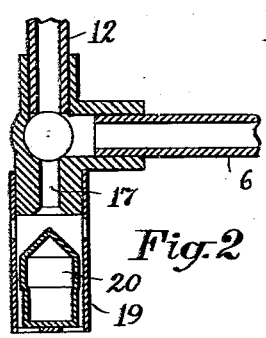
Fig. 1.
Fig. 2.
Fig. 3.
Inventor,
Robert P. Barnstead;
By A. B. Upham,
Attorney.

UNITED STATES PATENT OFFICE.

ROBERT P. BARNSTEAD, OF BOSTON, MASSACHUSETTS.

STERILIZER FOR DRINKING-GLASSES.

1,202,147.      Specification of Letters Patent.     Patented Oct. 24, 1916.

Application filed June 3, 1915. Serial No. 31,990.

*To all whom it may concern:*

Be it known that I, ROBERT P. BARNSTEAD, a citizen of the United States, and a resident of Boston, in the county of Suffolk and Commonwealth of Massachusetts, have invented certain new and useful Improvements in Sterilizers for Drinking-Glasses, of which the following is a full, clear, and exact specification.

One of the difficulties found to arise in connection with the sterilization of drinking utensils is that of expelling all the air from within the same in order that the scalding water shall reach every portion of the surfaces of the glasses; for, if the glasses or tumblers are dipped into the water bottoms down, they will float therein; if dipped reversed, the trapped air prevents the water from entering them, and if laid upon their sides on a submerging shelf, the glasses are liable to turn to an upright position, float against each other and become cracked or broken.

My sterilizer comprises essentially a submergible device having tubular vertical posts upon which the glasses or tumblers are inverted, and through which posts the air escapes from within the tumblers, and so permits the scalding water to reach every part thereof.

In the drawings, Figure 1 is a perspective view, with parts broken away, of my sterilizer. Fig. 2 is a sectional view of one of the float valves. Fig. 3 is an elevation partly in section, of one of the tubular posts.

The reference numeral 1 designates the tank designed to contain boiling water, and suitably supported upon a frame 2. Beneath the tank is a cylinder 3 having a plunger 4 rising therefrom through the bottom of the tank and bearing a four-armed head 5. Water being admitted to the lower end of the cylinder, the plunger and its head slowly rise nearly to the top of the tank.

Upon the four-armed head 5 is supported a rectangular frame composed of tubing 6 and 7 the members 6 of which are joined by several tubular cross bars 9. From the tubular cross bars rise the slender tubular posts 10 all in communication with the tubular bars and with the tubing 6, 7. Each post 10 terminates in a crown 11 the hollow and serrations of which permit of the escape of air into the tubular posts beneath the surface of a tumbler inverted thereon.

At each corner of the frame 6, 7 rises an upright 12 composed of tubing, and preferably supporting a cover 13 having upturned flanged edges 14. Close to the upper ends of the uprights are small holes 15 for the escape of air from the same.

Water having been admitted to the cylinder 3, the frame 6, 7 is elevated thereby to a point above the surface of the hot water in the tank. The tumblers, as at 16 in Fig. 1, are then placed bottom upward upon the posts 10, and the plunger permitted to descend until the tumblers are entirely submerged. During this descent, the pressure of the water rising within the tumblers causes the air therein to pass out through the posts, tubular cross bars, frame members and the uprights until it has all been replaced by the water, and the entire surfaces of the tumblers are exposed to the sterilizing action of the hot water. After the tumblers are wholly submerged, the water will enter the posts 10 and connected members. To enable this water to drain out, each corner of the tubular frame is given a drainage outlet 17 surrounded by a cage 19 containing a float valve 20. When the tubular frame 6, 7 descends into the water, these float valves rise into engagement with the outlets 17 and close them against the admission of water. But as the frame emerges from the water, these valves open and allow the water to drain out therefrom. The importance of this arrangement is evident when it is realized that were the tubular parts to remain filled with water, it would be practically impossible for the air to escape through the same from within the tumblers and so to allow the entrance into the latter of the scalding water.

My preferable means for the control of the water to the plunger comprises a plunger valve 21 whose stem 22 is actuated by a lever arm 23 fulcrumed at 24. The free end of the lever arm is drawn upward by a helical spring 25 anchored at 26, and is drawn downward by a bent rod 27 joined thereto by a helical spring 29 shorter and therefore stiffer than the spring 25. A suitably operated rocker shaft 30 has at one end a crank arm 31 to which is pivoted the lower end of the bent rod 27. When the shaft 30 is turned to present its crank arm 31 upward, the spring 25 raises the lever arm 23 and moves the plunger valve to one extreme; but when the rocker shaft is turned to present the crank arm 31 as illustrated in Fig. 1, the curvature of the rod 27 permits the crank arm to pass beyond its dead center but just far enough to lock it against return. The spring 29 by slightly yielding, permits the crank arm thus to pass its dead center, and then holds it there until the crank shaft 30 is forcibly turned back. Thus, by means of a foot lever connected with the rocker shaft, as 33 in Fig. 1, the rising and sinking of the rinsing and scalding frame is under full control while the attendant's hands are filled with the tumblers to be sterilized.

The flat flanged cover 13 is for receiving the tumblers after being cleansed, the former being heated by the steaming water and so hastening the drying of the articles. The rim 14 guards the tumblers against dislodgment.

What I claim is:

1. A sterilizer for glasses and the like comprising a tank for hot water, an instrumentality disposed for submerging therein, vertical posts rising from said instrumentality for receiving the glasses when inverted, and means for permitting the escape of the trapped air from the glasses while being submerged.

2. A sterilizer for glasses and the like comprising a tank for hot water, a frame composed of tubing disposed for submerging therein, vertical tubular posts carried by said frame and communicating therewith, and one or more tubular uprights rising from said frame and opening into the atmosphere.

3. A sterilizer for glasses and the like comprising a tank for hot water, a frame composed of tubing disposed for submerging therein, vertical tubular posts carried by the frame and communicating therewith, a tubular upright connected with the frame and opening to the atmosphere at its upper end, the frame having a drainage outlet, and a float-valve for closing said outlet when the frame is submerged.

4. A sterilizer for glasses and the like comprising a tank for hot water, a vertically movable instrumentality in the same, vertical tubular posts rising from said movable instrumentality, means of communication between the lower ends of said posts and the atmosphere, and a hollow crown-shaped head for each tubular post.

In testimony that I claim the foregoing invention, I have hereunto set my hand this 29 day of May, 1915.

ROBERT P. BARNSTEAD.